June 14, 1938. E. RYCHNER 2,120,769
DEVICE FOR CLEANING AND SHAMPOOING THE SCALP
Filed Jan. 29, 1936
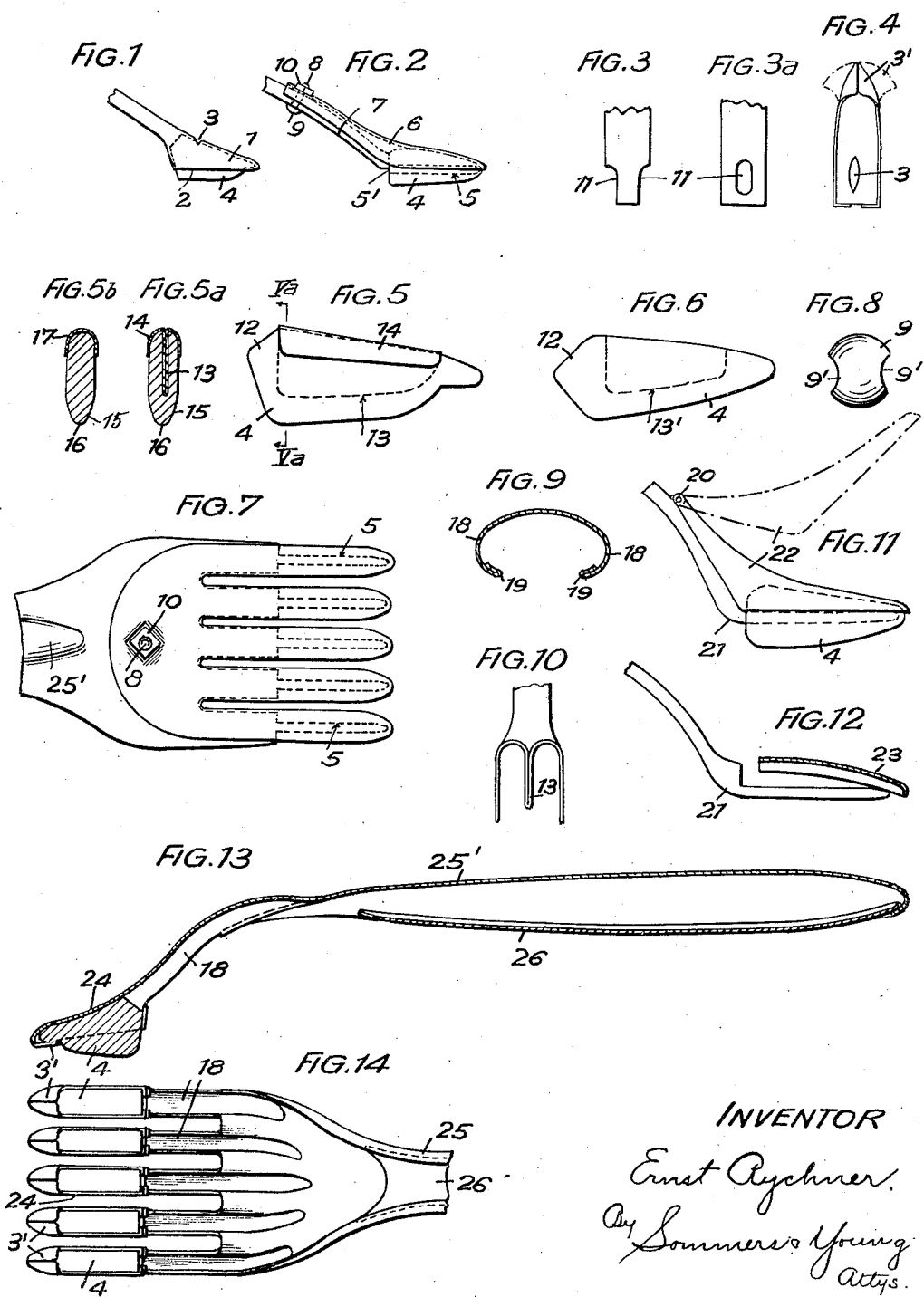
INVENTOR
Ernst Rychner
By Sommers & Young
Attys.

Patented June 14, 1938

2,120,769

UNITED STATES PATENT OFFICE 2,120,769

DEVICE FOR CLEANING AND SHAMPOOING THE SCALP

Ernst Rychner, Zurich, Switzerland

Application January 29, 1936, Serial No. 61,434
In Switzerland January 29, 1935

6 Claims. (Cl. 132—9)

This invention relates to devices for cleaning and shampooing the scalp.

Devices for treating the scalp are known which are provided with several finger-like members which extend outwardly from a central point of the device, and to which individual members made of absorbent material for cleaning and shampooing, i. e. rubbing in liquids as well as salves, are fastened. The hitherto known devices have, however, various drawbacks, as for example, that the devices, due to being of a complicated and costly construction, are too expensive for the major part of the people and that the exchanging of cleaning and shampooing members is too complicated, in that, these members had to be exchanged individually one after the other. The exchanging had to be carried out, in such manner, that for each cleaning and shampooing member the same tedious manipulations had to be repeated at each finger during detaching the used members and fastening new ones in their places, since each member is required to be detached interiorly of a hood or a head and to be fastened therein separately.

In contradistinction thereto, the device, according to the present invention, which is also provided with a handle and finger-like tines is distinguished by the fact that the tines are hollow so as to open downwardly towards the scalp and flat scalp treatment members of liquid absorbent material are provided which are pushed into self-supporting interengagement with the working ends of the hollow tines in order to project with their lower edges downwardly from these working ends. This arrangement has amongst others the following appreciable advantages, that the absorbent cleaning and shampooing members can be simply pushed into the fingers or slid thereon without requiring extra fastening. Furthermore, all the members, for example five in number, can be removed at the same time from the device. These advantages represent a considerable saving of time and thus a technical advance, when it is considered that, for example, a barber who uses five fresh cleaning members for each customer would each time have to fasten these to the device and subsequently remove them again each separately. By means of the present invention this operation can be accomplished in 5 to 10 seconds, whereas the old devices were unsuitable for use in a barber shop as being too complicated and time-consuming.

The simultaneous removal of all the inserted cleaning and shampooing members from the device, according to the present invention, is possible due to the fact that, for example, a protecting hood for the fingers of the device is provided with a rear end which is apertured to such an extent that, with the aid of an accessory the cleaning and shampooing members mounted in the device can be gripped from behind and can then be pulled or pushed out of the device at the rear ends of said sheaths through said apertures. The said accessory is provided with as many small points or hooks as there are sheath-like hood elements.

Since the cleaning and shampooing members are flattened when fixed protecting sheaths are provided for the device and the form of the members is adapted to the special shape of the hollow core of the sheaths, the thus shaped members of special configuration are held fast in position merely by being a close fit in the sheaths of appropriate lengths. Alternatively the hollow core of the sheaths may be provided with pointed or hook-like means for assisting in securing the cleaning and shampooing members in position. This can be accomplished by so arranging these means that the member is supported thereby, or else provision may be made for the cleaning and shampooing members being pierced by these means and thus be secured in this manner.

Instead of being provided with fixed protecting sheaths, the device may simply be provided with front pins which are arranged side by side and onto which for example, tubular cleaning and shampooing members are slid. In this case, all the cleaning and shampooing members are simultaneously covered on half their length by a hood in a readily detachable manner. Also this feature of the invention, permits of saving considerable time during continuous work with the device. This protecting hood, which is common to all cleaning and shampooing members, has a plurality of fingers, that is, each finger is covered by a correlated sheath which sheaths are united into a single protecting hood. Alternatively, each cleaning and shampooing member may be associated with a separate sheath for covering it approximately on half its length and these separate sheaths may be arranged, for example, on a common hinge pin so as to permit of securing the sheaths on their correlated fingers by turning them down thereon. In a variant construction, the separate sheath may be simply slid on the respective fingers and clamped in position by means of their rear ends. Protecting each cleaning and shampooing member by a sheath is necessary in order to prevent the hair becoming moist during the work of being anointed or becoming sticky with salve.

The common hood for all the cleaning and shampooing members of the same device bears, advantageously, against portions of the body of the device in depressions of the body and is detachably connected to the latter. In this way catching of hairs in the device so as to become tangled is prevented. With a view to avoiding this risk still more completely, between the parts of the device, and in the present instance, between the body of the latter and the protecting hood thereof, elastic packing members may be inserted. The said two parts of the device may, for example, be detachably connected to each other by a screw bolt having a nut, the latter being, advantageously, provided along its circular periphery with two or more substantially semi-circular recesses, so as to permit tightening the screw nut simply with the fingers of the hand, thus without a wrench.

In order to provide for ordinary tubular cleaning and shampooing members to project from the device a sufficient amount to be adapted to operate and serve their purpose adequately and satisfactorily, it is advantageous that the pins that occupy the foremost positions on the device and are intended to carry the cleaning and shampooing members project with their lowermost substantially horizontal portions downwardly beyond all the other portions of about the entire front half of the device or are at least flush with these portions which start out immediately from behind the said pins and extend upwardly.

Another constructional advantage of the novel device is that, with the exception of the protecting part including the sheaths, the device consists from the rearmost end of the handle to the foremost ends of the pins for the cleaning and shampooing members of an integral piece, or else that even the entire device, inclusive of the protecting sheaths, may consist of an integral piece which is, for example, the case, when the device is made of thin material such as sheet metal. In cases like this, the device or its parts are, advantageously, reinforced or stiffened by longitudinal and transverse ribs, embossed portions, raised edges, all of various shapes, in order to provide for adequate resistivity. Furthermore, all the edges of the device are advantageously broken and rounded-off so as to avoid scratching the scalp. This provision is particularly necessary for the edges of the hood.

When the device is stamped out from sheet metal or other relatively thin materials, advantageously, all the hollowed portions are formed therein so as to face downwardly. In this way passing with the device through the hair is considerably facilitated, as by this means the hair encounters no resistance. The various hollowed portions thus formed in the device may be entirely or partly filled out by means of fixed or detachable fillings in various ways, coloured fillings may, for example, also be applied for ornamental purposes.

A further technical advance consists in the fact that the cleansing and shampooing substance fills out the lowermost portions of the protecting hood of the device, so that, contrary to all prior constructions, no portions exist on the underside of the device which are not filled out with the cleaning and shampooing mass. In consequence of the rubbing surface thus being relatively larger than usual, the novel device is adapted to work more effectively.

In the accompanying drawings two embodiments of the device according to the invention are schematically illustrated by way of example only, in which Fig. 1 is a side view of a protecting hood of the device;

Fig. 2 is a side view of a device;

Fig. 3 is a plan view of a protecting sheath;

Fig. 3a is a plan view of a modified protecting sheath;

Fig. 4 is a bottom view of a further modified construction of a protecting sheath;

Fig. 5 is a side elevation of a flat cleaning and shampooing member;

Fig. 5a is a section on the line Va—Va of Fig. 5;

Fig. 5b is a sectional view of a modified construction of cleaning and shampooing member;

Fig. 6 is a side elevation of a modified cleaning and shampooing member;

Fig. 7 is a plan view of a removable hood;

Fig. 8 is a plan view of a screw nut;

Fig. 9 is a sectional view of a handle;

Fig. 10 is a side elevation of a portion of a hood;

Fig. 11 is a side view of a detail of a hood;

Fig. 12 is a side view of a modified detail of a hood;

Fig. 13 is a sectional view of a one-piece device; and

Fig. 14 is a fragmentary bottom view.

Fig. 1 shows a side view of a fixed protecting hood 1 of the device, according to the invention, the entire device of which the hood forms a part being made in a single piece, for example, as shown in Fig. 13, the cleaning and shampooing members being inserted into the hood by merely pushing them into position from below, at 2, without requiring extra fastening. Upwardly and forwardly on the hood of the device points or hooks 3 may be arranged. The cleaning and shampooing material 4 projects on the underside from the device.

Fig. 2 shows a side view of the front end of a device, this end consisting of pins 5 on which the cleaning and shampooing members 4 are simply slid from the front without requiring extra fastening. The hood 6, which is common for all the cleaning and shampooing members, is pushed over the entirety thereof so as to protect them altogether. This figure also shows that the common hood is supported inside of depressions 7 and is connected to the body of the device, at 8, by means of a screw bolt carrying a nut 9. For preventing the bolt from turning, the head 10 thereof may be made square and be sunk into a mating depression. At 5', the pins at the front end of the device are shown to project downwardly beyond all the remaining portions of the device in an approximately horizontal disposition.

The Figs. 3 and 3a each show a top plan view of a different protecting sheath of the hood of the device to be apertured at 11. These apertures may be in the form of passages extending vertically through the hood or provide an ordinary punching of the sheath for the purpose of permitting readily exchanging each of the cleaning and shampooing members at the same time.

Fig. 4 is a bottom view of a protecting sheath of the device, pointed flaps 3' for turning down on the absorbent material and hooks 3 being shown at the front and in the middle respectively of the sheath for assisting to secure the cleaning and shampooing members in position.

Figs. 5, 5a and 5b each show a side elevation, a section on the line V—V in Fig. 5, and a view of a variant construction of a flat cleaning and shampooing member which is shaped so as to fit the corresponding recess of the hood of the device. Engaging portions 12 for the accessory for removing the member from the hood are shown to be provided at the rear end of the member. Inside of the dotted line a reinforcing and fastening strip 14 is shown to be disposed in the interior of the cleaning and shampooing member. At 14, in Fig. 5a is evident how this strip grips behind the cleaning and shampooing material at the top to some extent only. In the variant construction shown in Fig. 5b is evident, at 15, that the cleaning and shampooing members are thinner at one end than in the middle, and in both Figures 5a and 5b is shown, at 16, that the ends of the members are semi-circularly rounded off. At 17 in Fig. 5b the reinforcing strip is shown to surround the cleaning and shampooing member at the top, only partly.

Fig. 6 shows in a side view of a cleaning and shampooing member the latter to be provided with a pocket-like recess 13' and the front and rear end of the member to extend above obliquely outwardly, as at 12.

Fig. 7 shows a plan view of a one-piece multi-fingered removable hood of the device. Pins 8 are arranged at the front end of the device for the reception of the cleaning and shampooing members, so that these members can be pushed readily on these members from the front. The square head 10 of the connecting bolt for the hood is shown to be inserted in a corresponding depression, so as to prevent it from turning during the bolt being tightened. At 25' a wedge-shaped longitudinal reinforcing rib is shown.

Fig. 8 shows a plan view of a screw nut having semi-circular recesses 9'.

Fig. 9 shows the cross section of the handle of the device to be vaulted for reinforcing the device, and the hollowed portions of the device, which is stamped out of thin material, to face downwardly, embossed marginal portions 18 being provided for further reinforcement and the lower edges throughout the device being considerably thickened by crimping, at 19, in order to prevent cutting and scratching the scalp.

Fig. 10 shows a cross-section of a portion of a hood to be formed with an interior reinforcing and holding strip for the cleaning and shampooing members.

Fig. 11 shows in a side elevation how the hood of the device can also be pushed as individual protecting sheaths from above on the individual cleaning and shampooing members and be lifted off the latter again with the aid of a hinge pin 20. This figure shows also that the underside of the pin for the reception of the cleaning and shampooing members extends substantially horizontally parallel with the other lowermost portions 21 of the device. The cleaning and shampooing material 4 being also shown to project below the undersides of the pins.

Fig. 12 is a view similar to Fig. 11 showing an individual hood element which is adapted to be pushed over an individual cleaning and shampooing member and to be clampingly fastened thereto.

Fig. 13 shows a side sectional elevation of a device which is made in a single piece, a reinforcing longitudinal rib 25' being provided at a portion which, when the device is in use, is subjected to considerable bending. Reinforced edges are formed by crimping the marginal embossed portions 18 of the thin material of the device for increasing the strength thereof. Longitudinal embossed ribs 25 are also provided for the same purpose. At 26 is shown how the hollow portions formed can be filled out, so that the handle may become solid, if desired. At 24 is evident that the cleaning and shampooing members occupy the lowermost portion of the device so as to fill it out and, at 4, is shown that the cleaning and shampooing member projects considerably from the device and is thus adapted to work effectively.

Fig. 14 is a fragmentary bottom view of the device showing the absorbent material 4 to be inserted between the turned down flaps 3'.

The device is handled as follows:

After grasping the handle, the absorbent cleaning and shampooing members are dipped into a bowl containing but very little liquid. Then the wetted members are inserted into the device and passed with its end through the hair across the scalp. In this way the scalp is cleaned and shampooed by means of the device.

What I claim is:

1. In a device for cleaning and shampooing the scalp, a fork-like implement, tines on said implement having hollows opening downwardly towards the scalp, and flat scalp treatment members of liquid absorbent material each pushed into self-supporting interengagement with the working end of one of said hollow tines so as to project with their lower edges downwardly from said tine working ends.

2. In a device for cleaning and shampooing the scalp, a fork-like implement, tines on said implement having hollows opening downwardly towards the scalp, an outer portion on the working end on said tines at least partly bottomed opposite the scalp, flat scalp treatment members of liquid absorbent material, and a forwardly projecting portion on each of said members engaging into one of said bottomed tine portions, when said members are pushed into self-supporting interengagement with said hollow tine working ends so as to project with their lower edges downwardly from the latter.

3. In a device for cleaning and shampooing the scalp, a fork-like implement, tines on said implement having hollows opening downwardly towards the scalp, an outer portion on the working end on said tines at least partly bottomed opposite the scalp, a part on said tines upwardly inclined from the rear of said working end, shoulders extending into the hollow space of said tines at the rear of said working end from both sides thereof not quite to its middle, flat scalp treatment members of liquid absorbent material, a forwardly projecting portion on each of said members, a convexed rear portion on each of said members forced along its curved contour into interengagement with said shoulders, when said members are each pushed into one of said hollow working ends with their lower edges downwardly directed, while said forwardly projecting portions engage into one of said bottomed tine portions, and an accessory for removing said members from said working ends when entering between the respective shoulders while being guided along the hollow space of the inclined tine part leading thereto.

4. In a device for cleaning and shampooing the scalp, a fork-like implement, tines on said implement having hollows opening downwardly towards the scalp, an outer portion on the working end on said tines at least partly bottomed opposite the scalp, a reinforcing strip depending centrally into said working end longitudinally thereof, flat scalp treatment members of liquid absorbent material longitudinally apertured at their upper edges for self-supporting interengagement with said reinforcing strips, for holding said members to said strips, when said members are pushed into said hollow tine working ends so as to project with their lower ends downwardly from the latter.

5. In a scalp treatment member for use in a device for cleaning and shampooing the scalp, a flat treatment member body of liquid absorbent material, a projecting portion on the front longitudinal end of said body, and a convexed rear end on said body, when looking at the latter in the transverse direction thereof from any one of the flat sides.

6. In a scalp treatment member for use in a device for cleaning and shampooing the scalp, a flat treatment member body of liquid absorbent material, a projecting portion on the front longitudinal end of said body, and a projecting cusp provided on the rear end of said body, when looking at the latter in the transverse direction thereof from any one of its flat sides.

ERNST RYCHNER.